April 22, 1924.
J. A. H. GASTONGUAY
1,491,472
CONSTRUCTION OF SPARK PLUG SHELLS AND INSULATORS
Filed Aug. 6, 1920
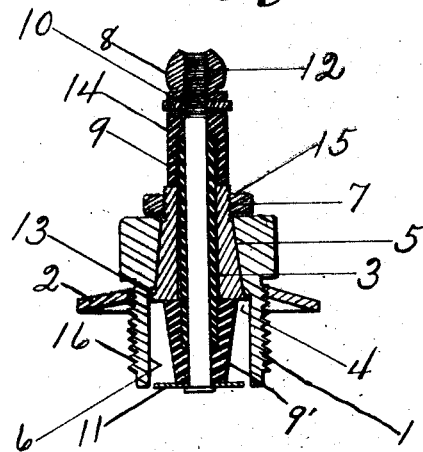
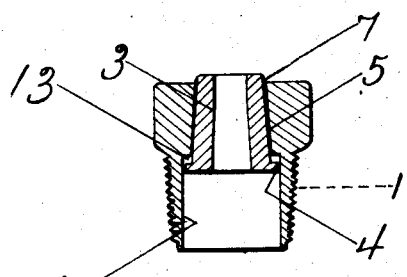
Joseph Arthur Henry Gastonguay
INVENTOR.
BY  J. O. Fowler.
ATTORNEY.

Patented Apr. 22, 1924.

1,491,472

UNITED STATES PATENT OFFICE.

JOSEPH ARTHUR HENRY GASTONGUAY, OF BOSTON, MASSACHUSETTS.

CONSTRUCTION OF A SPARK-PLUG SHELL AND INSULATOR.

Application filed August 6, 1920. Serial No. 402,074.

*To all whom it may concern:*

Be it known that I, JOSEPH ARTHUR HENRY GASTONGUAY, a citizen of the United States, and a resident of Boston, in the county of Suffolk and State of Massachusetts, have invented a certain new and useful Improvement in Constructions of Spark-Plug Shells and Insulators, of which the following is a specification, the same being a full, clear, and exact description of the invention, such as will enable others skilled in the art to which it appertains to readily understand the same.

This invention relates to a new type of spark plug shell conveniently fitted exteriorly with a separable collar or nut and provided with an inwardly movable metal sleeve held in position by means of a tapered shoulder alone or with an adjustable collar or thumb-nut screwed onto said metal sleeve.

In order to attain the desired end the invention consists in the construction, arrangement, combination and operation of parts hereinbelow set forth.

In the drawings, illustrative of one embodiment of the invention, Figure 1 represents a sectional view of an article constructed according to my invention, and Figure 2 is a detail sectional view of the shell and sleeve.

Referring more in detail to the drawings, the numeral 1 denotes the body of the plug comprising a shell exteriorly threaded as at 16 and having a lower straight bore 6 adapted to serve as an electrode and a smaller tapered bore 5 and an intermediate internal shoulder 13. A movable and detachable collar or nut 2 is constructed and arranged to engage with the said thread 16 at will. The said collar or nut forms a threaded gasket ring of tapered form and having a sharp edge and also having the body portion concaved in order that when the shell is screwed down tight, the force exerted thereby serves to press the ring 2 against the engine cylinder sufficiently to cause the same to conform to the face of the cylinder and to form an air tight joint between the spark plug and the cylinder whereby the employment of the ordinary gasket may be dispensed with.

Within the said shell is positioned a movable and detachable preferably metal sleeve 3 of tapered form and having a lower sharp edged flange or shoulder 4 adapted to serve as a carbon and dirt scraping device for the bore 6 and preferably arranged to contact or lie adjacent to the shoulder 13.

An insulating and preferably mica core 9, 9' is contained within the sleeve and encloses a conducting element 10 having at the lower end thereof a flat disk-like electrode 11 registering with the bottom of the shell and terminating at its upper extremity with a threaded portion 12.

The said insulating core is tapered toward the top to conform to the tapered bore of the sleeve and tapered toward the bottom thereof to afford an annular sparking and carbon collecting chamber between the same and the lower straight bore of the shell.

The said core preferably has a portion 14 extending above the shell 1 the sleeve being also preferably threaded as at 7. The said core and sleeve may be movable in and detachable from the shell at will but if desired they may be held in suitable adjusted position by a nut or washer 15 engaged with the thread 7.

A nut 8 may be engaged with the electrode thread 12 to constitute a wire terminal or binding device to connect a line wire with the electrode, which nut may also serve to hold the parts in relative operative position.

The conducting element 10 extends above the core member and carries the nut 8 of smaller diameter than that of the tapered bore 5 and also a washer 8' positioned intermediate the core member and the nut and greater in diameter than that of the said tapered bore, and adapted when lowered or tapped down to prevent undue depression of the conducting member and insulating core when the latter are lowered for the purpose of priming the engine by pouring gasoline through the annular chamber or channel formed between the tapered bores of the depressed sleeve and the shell thereby dispensing with the necessity of the employment of the ordinary priming cocks.

It will be noted that the projection or shoulder 13 working in the bore 6 also serves as a guide for the sleeve and core when the latter are depressed.

In operation the force of the explosions in the engine forces the core and sleeve upwardly so as to be in air tight relation with the tapered bore of the shell and thus seal the firing chamber. When, however, the plug is detached from the engine cylinder the nut 15 working on the top of the sleeve 3 may serve to hold the said core and sleeve in position in the enclosing shell.

What I claim as my invention is:—

1. In a device of the class described, a shell having a lower straight bore adapted to serve as an electrode and a smaller upper tapered bore, a movable sleeve in the upper bore of the shell of tapered form having a lower sharp edged flange or shoulder to scrape the straight bore of the shell, and an insulated electrode enclosed by the said sleeve.

2. In a device of the class described, an exteriorly threaded shell having a straight bore adapted to serve as an electrode, a collar or nut to engage the thread, a movable sleeve in the shell having a lower sharp edged flange or shoulder to contact the straight bore of the shell, a detachable collar or nut having means to engage the said movable sleeve, an insulating core within the sleeve and extending upwardly therefrom, and an electrode enclosed by the said core.

3. In a device of the class described, a body member having a bore of tapered form and a lower straight bore, a therein contained insulated conducting member, and an intermediate movable tapered metal sleeve lying in both of said bores and having a lower annular shoulder to contact the straight bore, and tightly wedged between and fitted to said tapered bore and thus adapted to be tapped down to allow gasoline to be poured through the opening between the two said tapers to prime the engine.

4. In a device of the class described, a body member having a bore of tapered form opening into a straight bore, a therein contained insulated conducting member, and an intermediate movable metal sleeve tightly wedged between and fitted to said tapered bore and having a guiding projection extending into the straight bore and thus adapted to be tapped down to allow gasoline to be poured through the opening between the tapered bore of the shell and the tapered sleeve to prime the engine.

5. In a device of the class described, a shell having a straight bore adapted to serve as an electrode, a movable core in the bore having a lower sharp edged projection or shoulder to scrape the bore of the shell and an electrode enclosed by the said core.

Aug. 5, 1920.

JOSEPH ARTHUR HENRY GASTONGUAY.

Witnesses:
  JOHN J. WALSH,
  EDWARD J. RYAN.